Dec. 19, 1961     L. A. STRUBHAR     3,013,661
FRUIT GRADING APPARATUS
Filed Nov. 7, 1960     2 Sheets-Sheet 2
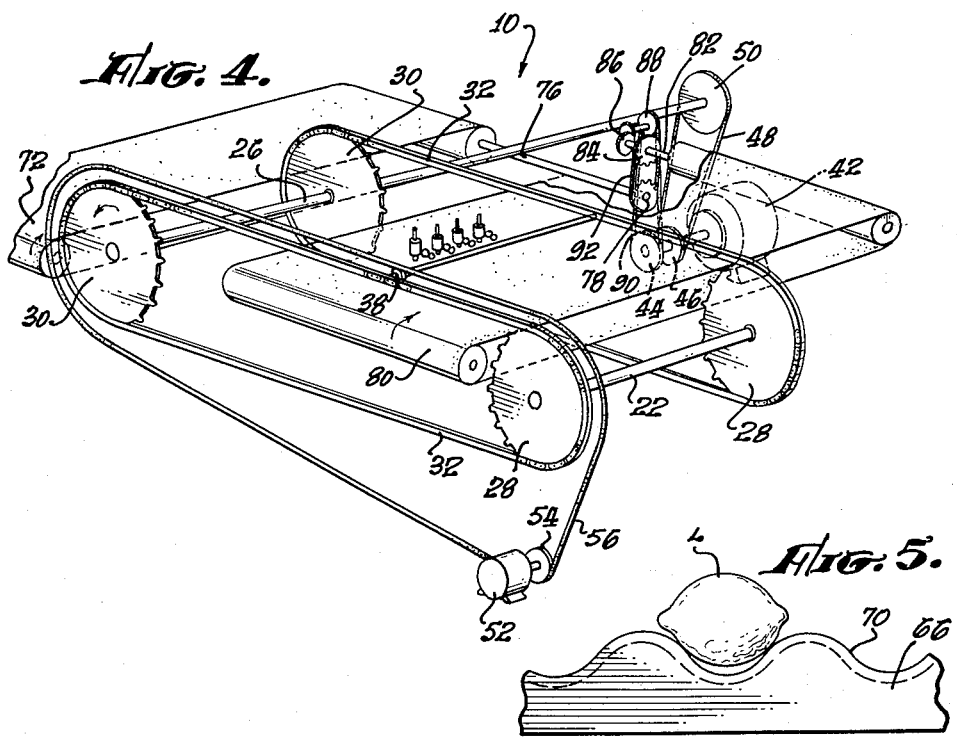
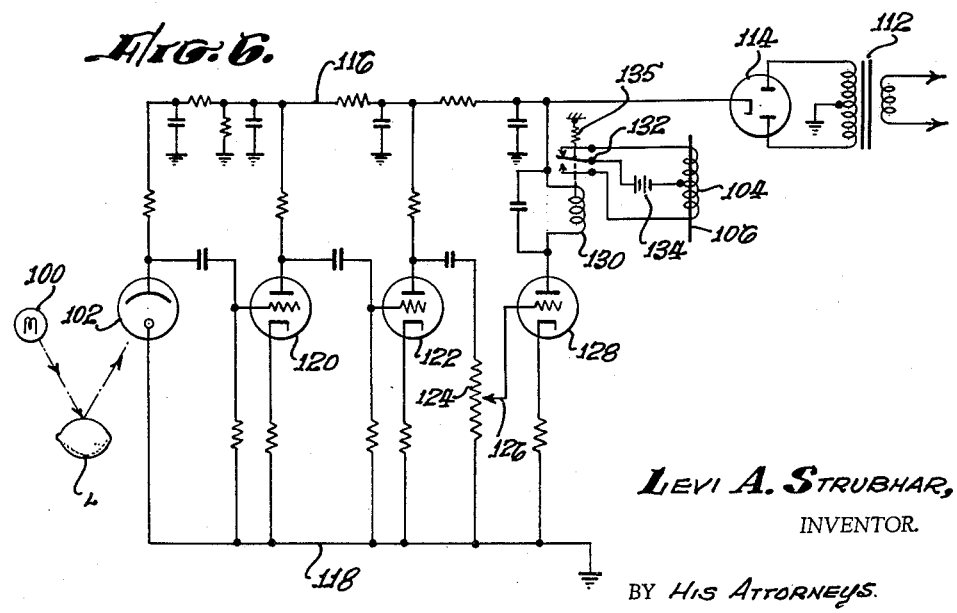
LEVI A. STRUBHAR,
INVENTOR.
BY HIS ATTORNEYS.
HARRIS, KIECH, RUSSELL & KERN.

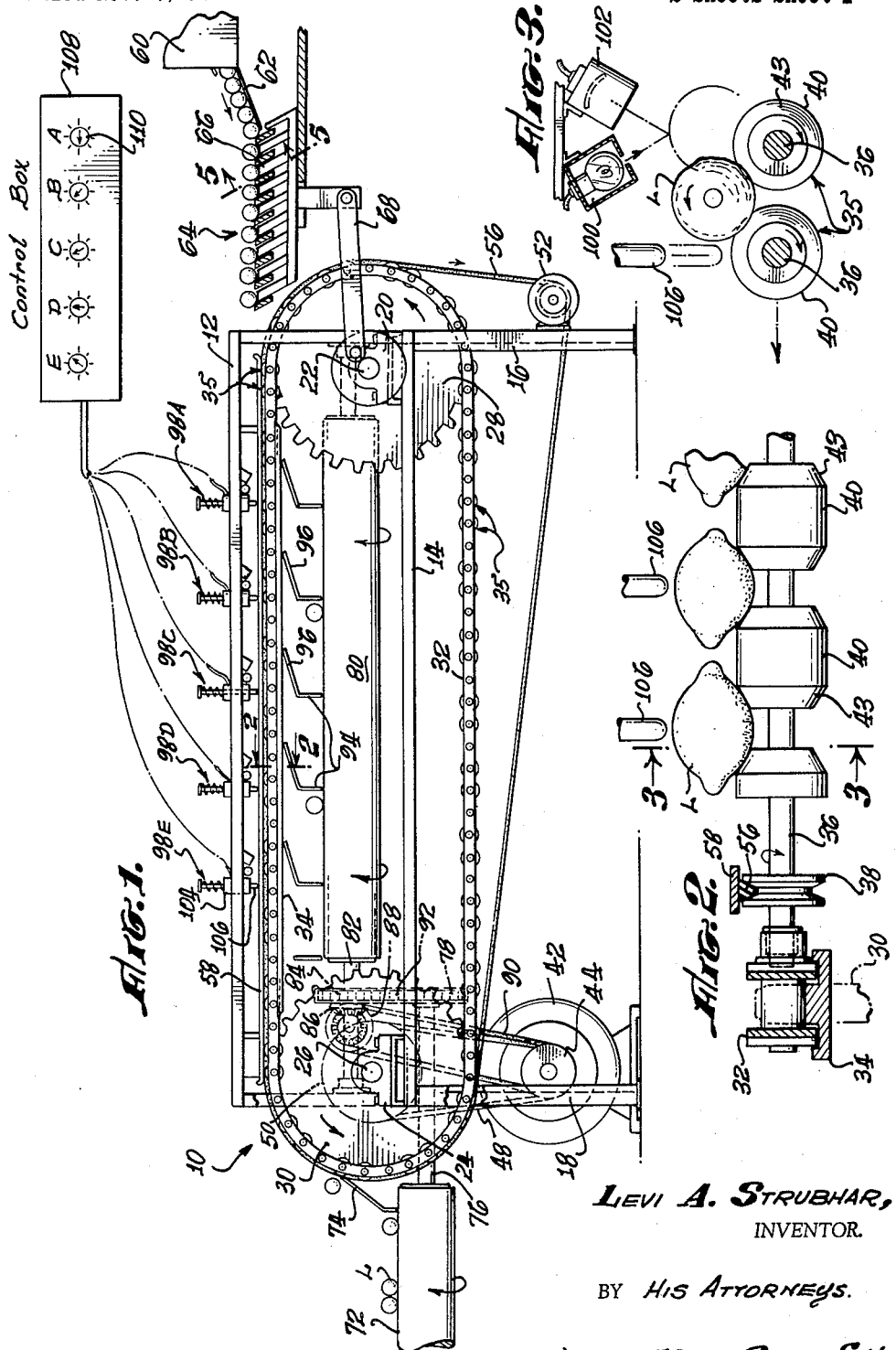

United States Patent Office 3,013,661
Patented Dec. 19, 1961

3,013,661
FRUIT GRADING APPARATUS
Levi A. Strubhar, Upland, Calif.
(Rte. 1, Box 64, Hubbard, Oreg.)
Filed Nov. 7, 1960, Ser. No. 67,709
11 Claims. (Cl. 209—111.5)

The present invention relates generally to the food processing art and more particularly to a novel fruit grading apparatus which has great utility in the sorting or grading of lemons and the like which are of different colors or shades of color and with different degrees of light reflectivity.

Briefly stated, one embodiment of the present invention comprises a continuous conveyor including spaced-apart rotatably mounted fruit-supporting means extending transversely thereof. Means are provided for moving the conveyor in one direction and the upper surfaces of the roller members in the opposite direction, whereby the upper surfaces of the fruit supported in the rollers rotate in the same direction as the movement of the conveyor. Banks of ejecting mechanisms are positioned over the conveyor so as to extend transversely thereof, each of said mechanisms including a depending ejection member which is movable between an inoperative position away from the fruit and an operative position in the path of the fruit. Means are also provided for moving the ejection member to the operative position responsive to the physical characteristics of the fruit, as for example the color or light reflectivity thereof so as to eject the fruit from the conveyor and grade or sort it accordingly.

As is well known in the fruit industry, fruit such as lemons, oranges, apples, and the like have to be graded according to size and color before they are packaged for shipment and sale. Various types of devices have been tested from time to time to endeavor to devise an apparatus which will quickly and safely sort or grade fruit according to surface colorations. However, most, if not all, of the known devices have had serious limitations which prevented them from being suitable for use on a commercial basis. Thus, some of them bruise the fruit so badly that there is considerable spoilage and waste, whereas others were too complicated and costly. Yet other unsatisfactory devices did not grade or sort the fruit properly.

It is an object of the present invention, therefore, to provide a novel fruit grading apparatus for grading or sorting fruit based on surface coloration or variations in color, which is relatively simple in construction and certain in its operation. More particularly, it is an object to provide such a device which is responsive to the amount of light or color of light reflected from the fruit so as to quickly and accurately grade or sort the fruit which passes through it.

Another object is to provide a novel fruit grading apparatus which directs the fruit into various compartments without bruising it. More particularly, it is an object to provide such an apparatus in which the fruit is ejected from a moving carrier with a minimum amount of force between the fruit and the ejecting means.

A further object of the present invention is to provide a novel fruit grading apparatus which can be used to grade or sort fruit into any number of groups or classes depending upon the differences in surface coloration.

Yet another object is to provide such a device which can be used for grading or sorting any type of product which is generally circular in shape and which varies in surface coloration or light reflectivity.

Further objects and advantages of the present invention will be apparent from the following detailed description, reference being had to the accompanying drawings wherein a preferred embodiment of the present invention is shown.

Throughout the present disclosure the instant invention will be described as embodied in a device for sorting or grading lemons, but it is to be understood that the invention is not so limited but that it can be applied to other types of products and objects which are generally cylindrical or spherical in shape.

In the drawings:

FIG. 1 is a side elevational view of a fruit grading apparatus constructed in accordance with the teachings of the present invention;

FIG. 2 is an enlarged fragmentary vertical sectional view taken on the line 2—2 in FIG. 1;

FIG. 3 is an enlarged vertical sectional view taken on the line 3—3 in FIG. 2;

FIG. 4 is a perspective view looking down on the device as shown in FIG. 1, various of the parts being omitted for purposes of simplification;

FIG. 5 is an enlarged fragmentary elevational view of one of the shuffle boards for feeding the fruit into the device; and FIG. 6 is a schematic wiring diagram of one control circuit.

Referring to the drawings more particularly by reference numerals, 10 indicates a lemon grading apparatus embodying the teachings of the present invention, which includes a supporting framework of structural members containing longitudinally extending spaced top members 12, bottom members 14, and vertically extending front members 16 and rear members 18. Mounted on the bottom members are front trunnions 20 which rotatably support a front shaft 22, and rear trunnions 24 which rotatably support a rear shaft 26. Front sprocket wheels 28 are mounted on the ends of the front shaft 22, and in like manner, rear sprocket wheels 30 are mounted on the rear shaft 26, such sprocket wheels supporting spaced sprocket chains 32 which are positioned at opposite sides of the frame work in parallel relationship. Longitudinally extending guide plates 34 (FIG. 2) are positioned beneath the upper stretches of the chains so as to support them in a horizontal plane for a purpose to appear.

Extending between the two sprocket chains 32 so as to be rotatably supported thereon are pairs of closely spaced roller members 35, each of which includes a shaft 36 having a grooved pulley wheel 38 (FIG. 2) adjacent one end thereof. Mounted on the aforementioned shafts are spaced-apart rollers 40 which have protuberances or sloping end surfaces 43, the distance between the rollers on each shaft and the slope of the end surfaces thereof being such that fruit such as lemons L can be received and be supported thereby in a rolling relationship (FIG. 2). In like manner, the distance between the rollers 40 on the adjacent closely spaced roller members is such that the fruit is supported therebetween as shown in FIG. 3. However, the distance between adjacent pairs of closely spaced roller members 35 is greater than the size or diameter of the fruit being graded so that it can pass downwardly therebetween for a purpose to appear.

A main motor 42 is mounted on the floor adjacent one of the rear vertical members 18 and contains an outer pulley 44 and an inner pulley 46 on the shaft thereof, the inner pulley 46 being connected by means of a belt 48 with a driven pulley 50 on the rear shaft 26. The motor 42 turns in the counterclockwise direction as viewed from the shaft end thereof so that the upper portion of the sprocket chain 32 and the roller members 35 supported thereby move from right to left as viewed in FIGS. 1 and 4.

A secondary motor 52, which is mounted on one of the front vertical members 16, contains a pulley 54 which drives a V-belt 56 which is in engagement with the pulleys 38 mounted on one end of each of the roller shafts 36. The motor 52 is reversible and of variable speed but normally rotates in the direction to drive the upper portion of the V-belt 56 from left to right as viewed in FIGS. 1 and 4. However, as will be discussed more fully hereinafter, the main objective is to have the upper surfaces of the roller members 35 rotate in the direction opposite to the movement of the upper stretch of the conveyor. Thus, referring to FIG. 3, in the conventional operation of the device the roller members 35 in the upper stretch are moving from right to left and the individual rollers 35 are rotating in the clockwise direction. An elongated strip 58 (FIGS. 1 and 2) is positioned above the V-belt 56 so as to maintain it in driving engagement with the pulleys 38 on the roller shaft.

Adjacent the front or right-hand end of the device (FIG. 1) is a bin 60 for storing the lemons L and releasing them onto a chute 62 which leads to a feeding mechanism 64 containing a plurality of oscillating shuffle boards 66 which are driven through a linkage 68. Each shuffle board 66 (FIG. 5) contains a series of grooves or indentations 70 of a size to receive a lemon L, which are in axial alignment with the spaces between the rollers 40 on the roller shaft 36. Thus, the lemons L are directed onto the roller members so as to be received in supporting position between the individual rollers 40 on the closely spaced roller members 35.

Positioned adjacent the rear or left-hand end of the device (FIGS. 1 and 4) is a secondary conveyor 72 which moves at right angles to the movement of the sprocket chains 56 and which receive the lemons L from a chute 74 positioned adjacent the rear sprocket wheels 30. This secondary conveyor 72 is driven through a shaft 76 which has a pulley 78 on the end thereof.

A large separating conveyor 80 (FIGS. 1 and 4) is positioned between the front and rear sprocket wheels 28 and 30, respectively, and beneath the upper stretch of the roller members 35. It also moves transversely of the movement of the sprocket chains 32 and the roller members 35, and is driven by means of a shaft 82 which contains a large inner pulley 84 and a small outer gear 86 mounted on one end thereof. The small outer gear 86 is driven through a gear and pulley set 88 which in turn is driven through a belt 90 in engagement with the pulley 44 on the main motor shaft. The pulley 84 is connected with the aforementioned pulley 78 on the secondary conveyor shaft by means of a belt 92, whereby the two conveyors move in unison.

Positioned between the upper surface of the separating conveyor 80 and the upper stretch of roller members 35 are a plurality of elongated vertically extending dividers 94, each of which includes an inclined upper portion 96, the dividers being substantially parallel with the rollers and extending the full distance between the sprocket chains 32 for a purpose to appear.

Mounted between the upper framework members 12 and above the upper stretch of roller members 35 are a plurality of parallel banks of ejecting mechanisms 98A through 98E, each of which includes a light source 100 (FIG. 3) a light-responsive member such as a photoelectric cell or tube 102, and a solenoid operated ejector 104 with an ejection member 106. Each ejecting mechanism 98 is positioned in vertical alignment with the space between adjacent rollers 40 on each roller member 35 so as to be directly above the lemons L as they pass along the device supported between said roller members. As shown in FIG. 3, each ejection member 106 is movable between an operative position immediately in the path of the lemon L and an inoperative position spaced from the lemons L and is positioned rearwardly (or downstream) of the light source 100 and photocell 102 for a purpose to appear.

A control box 108 with control knobs 110 for each bank of ejecting mechanisms contains the control circuits shown schematically in FIG. 6. Thus, the circuit for each ejecting mechanism includes a common transformer 112 which has its input side connected to a power source (not shown) and its output side connected to a full wave rectifier tube 114 which in turn is connected to the "hot" line 116, the other line 118 being grounded to provide a return path through the center tap of the transformer. Connected between the two lines 116 and 118 are a first stage amplifier 120 and a second stage amplifier 122, the output of the latter being impressed across a potentiometer 124 which includes a variable wiper 126 actuated by the aforementioned control knob 110. The knob 110 and the wiper position determine the amount of reflected light which is required to actuate the ejecting mechanism, as will be described more fully hereinafter. The wiper 126 is connected to the control grid of a third amplifier 128 and the latter's plate circuit or output is connected in series with a solenoid 130. The solenoid 130 actuates a two-way switch 132 which has an upper circuit and a lower circuit connected to the ejector solenoid 104 through a battery or separate power supply 134. The switch 132 is biased by means of a spring 135 to close the upper circuit when the solenoid 130 is not fully energized and to close the lower circuit when its is fully energized. Consequently, when the upper circuit is closed, current from the battery 134 flows through the upper half of the ejector solenoid 104 so as to maintain the ejection member 106 in the raised or inoperative position. On the other hand, when the lower circuit is closed, the lower half of the ejector solenoid 104 is energized so as to move the ejection member 106 to the downward or operative position. Obviously, each control circuit also contains conventional load resistors, grid resistors, coupling condensers, and the like which are shown but not identified because they form no part of the present invention.

Turning to a consideration of the adjustment of the ejecting mechanisms, each bank is adjusted by means of the control knob 110 associated therewith so as to eject at a predetermined level or intensity of light (or color) reflected from the lemons passing beneath it. Thus, the bank 98A closest to the front or right-hand end of the device is adjusted to eject when the greatest amount of light is reflected, i.e. when the bright yellow lemons pass under the ejecting mechanism 98A. The bank 98B, in turn, is adjusted to eject the dull yellow lemons, the bank 98C is adjusted to eject the bright green lemons, etc. The extremely dark or discolored lemons will not be ejected and will therefore pass from the end of the device onto the chute 74 previously described.

In use, the lemons to be sorted or graded according to color or light reflectivity are placed in the bin 60 and passed down the chute 62 onto the shuffle board feeding mechanism 64. Inasmuch as the grooves 70 of the boards 66 are in alignment with the space between the rollers 40 on the roller members 35, the lemons are accurately fed onto the roller members 35 so as to be supported between closely spaced roller members and between adjacent rollers 40 thereon (FIGS. 2 and 3). The sprocket chains 32 move in the counterclockwise direction so that the upper stretch of roller members 35 moves from right to left as viewed in FIG. 1. However, the movement of the V-belt 56 relative to the sprocket chains 32 is such that the individual roller members 35 in the upper stretch passing beneath the ejecting mechanisms rotate in the clockwise direction. This can be accomplished by maintaining the V-belt stationary, by rotating it in the clockwise direction, or by rotating it in the counterclockwise direction at a rate slower than the movement of the sprocket chain 32. An important feature of the present invention is the movement of the upper surfaces of the individual roller members 35 in the upper stretch in the direction opposite to the movement of the sprocket chains whereby the upper surfaces of the lemons rotate in the same direction as the movement of the sprocket chains. Another important feature is the ability to vary the relative speed between the sprocket chains 32 and the V-belt 56 so as to be able to vary the speed at which the lemons rotate on the roller members 35. This can be accomplished by means of the motor 52 which is a variable speed motor and which can be driven in either direction, as previously described, or by other types of variable speed and reversible drive means.

As lemons L approach the first bank of ejecting mechanisms 98A, the light source 100 associated therewith directs a beam of light onto the rotating lemon and the light is reflected to the photoelectric tube 102 which thereby has a change impedance depending upon the magnitude of the reflected light. This changed impedance affects the outputs of the first and second stage amplifier tubes 120 and 122, respectively, and the amount of current which flows through the potentiometer 124. Thus, the grid potential of the tube 128 and the amount of current which flows through the solenoid 130 is dependent upon the setting of the potentiometer wiper 126 (adjusted by the control knob 110) and the amount of light reflected from the lemon onto the photoelectric tube 102. Assuming that the wiper 126 of the potentiometer 124 is set to eject when a bright yellow lemon with high reflectivity passes beneath the first bank 98A, and such a lemon is in fact passing therebeneath, the current through the solenoid 130 is thereby increased so as to overcome the action of the spring 135 and close the lower circuit through the switch 132 and cause the ejection member 106 to move downwardly to the operative position and into the path of the lemon (FIG. 3). The lemon which is rotating in the counterclockwise direction then strikes the ejector member 106 and is ejected upwardly and away from the closely spaced roller members 35 so as to drop downwardly between adjacent sets thereof, which, as previously described, are spaced apart a sufficient distance to permit the passage of the fruit or other objects being graded. The ejected lemon falls downwardly onto the inclined upper portion 96 of the first divider 94 and thence onto the separating conveyor 80 between the first and second dividers 94.

Obviously, if the lemon has a dull yellow coloring, it would pass the first bank of ejecting mechanisms 98A and be ejected by either the second or a subsequent bank so as to drop onto the separating conveyor 80 between two of the dividers 94. In this manner most of the lemons are ejected from the closely spaced roller members and drop onto the separating conveyor 80 so as to be carried to the side and deposited in boxes (not shown) positioned between the various dividers 94.

The very dark lemons which are not ejected pass from the end of the device, down the chute 74 and onto the secondary conveyor 72 and thence into boxes placed adjacent the end thereof.

Thus, it is apparent that there has been provided a novel fruit grading apparatus which fulfills all of the objects and advantages sought therefor.

The device is relatively simple in its construction and the control knobs 110 can be set to eject or grade the lemons or the like based on any amount or degree of difference in the color or reflectivity thereof. Although only five stages or banks are shown, it is clear that there could be as few or as many as desired in order to separate the lemons or the like into any number of groups based on differences in color or light reflectivity.

Inasmuch as the lemons are rotated as they pass beneath the ejecting mechanisms, they are selected based on an average color or light reflectivity. Also, because they are rotating in a direction to engage the depending ejection member with a downward blow, they tend to roll up the ejection member 106 and onto the top of the rear roller member which is rotating in the clockwise or discharge direction and thereby eject easily and quickly from between the roller members with little or no bruising.

Although no previous mention has been made herein of the use of color filters, it is to be understood that such filters could be used with the light source 100 or the photo-electric tube 102, or both, in order to eject or select, based on differences in color as differentiated from differences in the amount of light reflectivity.

It is also to be understood that the foregoing description and accompanying drawings have been given only by way of illustration and example and that changes and alterations in the present disclosure which will be readily apparent to one skilled in the art are contemplated as within the scope of the present invention.

I claim:

1. Grading apparatus for fruit and the like, comprising: a continuous conveyor including spaced-apart rotatably mounted fruit-supporting means extending transversely of the conveyor, means for moving the conveyor in one direction; means for rotating the fruit supporting means in a direction to move the uppermost surfaces of the fruit supporting means in the direction opposite to the movement of the conveyor; means for introducing fruit onto the fruit-supporting means; a bank of ejectors extending transversely of the conveyor, each of said ejectors including an ejection member movable to an operative position in which it projects into the path of fruit carried on said supporting means to cause it to be ejected therefrom; and means responsive to the physical characteristics of the fruit on the supporting means passing adjacent the ejector for moving the ejection member thereof to the operative position.

2. Grading apparatus for fruit and the like, comprising: a continuous conveyor including transversely extending pairs of spaced supporting roller members mounted in spaced-apart relationship, the roller members in each pair of roller members being spaced to support fruit therebetween and the space between pairs of roller members being sufficient for fruit to pass therebetween; means for moving the conveyor in one direction; means for rotating said roller members in a direction to move the tops of the roller members in the direction opposite to the movement of the conveyor; means for introducing fruit onto the supporting roller members; a bank of ejectors positioned over the conveyor and extending transversely thereof, each of said ejectors including an ejection member movable between an inoperative position away from the conveyor and an operative position adjacent the conveyor in which it projects into the path of fruit carried on said supporting roller members; and means responsive to the physical characteristics of the fruit on the supporting roller members passing beneath the ejector for moving the ejection member thereof from the inoperative position to the operative position.

3. Grading apparatus for fruit and the like, comprising: a continuous conveyor including transversely extending pairs of spaced supporting roller members mounted in spaced-apart relationship, the roller members in each pair of roller members being spaced to support fruit therebetween and the space between pairs of roller members being sufficient for fruit to pass therebetween, the supporting roller members containing aligned spaced rollers for supporting the fruit in predetermined spaced apart positions thereon; means for moving the conveyor in one direction; means for rotating the roller members in a direction to move the tops of the roller members in the direction opposite to the movement of the conveyor; means for introducing fruit onto the supporting roller members between the rollers; a bank of ejectors positioned over the conveyor and extending transversely thereof, each of said ejectors including an ejection member movable between an inoperative position away from the conveyor and an operative position adjacent the conveyor in which it depends toward the space between said rollers in the path of the fruit carried thereby; and means responsive to the physical characteristics of the fruit on the supporting roller members passing beneath the ejector for moving the ejection member thereof from the inoperative position to the operative position.

4. Grading apparatus for fruit and the like, comprising: a continuous conveyor including transversely extending pairs of spaced supporting roller members mounted in spaced-apart relationship, the roller members in each pair of roller members being spaced to support fruit therebetween and the space between pairs of roller members being sufficient for fruit to pass therebetween; means for moving the conveyor in one direction; means for rotating the roller members in a direction to move the tops thereof in the direction opposite to the movement of the conveyor; means for introducing fruit onto the supporting roller members; a plurality of spaced-apart banks of ejectors positioned over the conveyor and extending transversely thereof, the ejectors in each of said banks each including an ejection member movable between an inoperative position away from the conveyor and an operative position adjacent the conveyor in which it projects into the path of the fruit carried on the supporting roller members; a plurality of transversely extending conveyor means positioned beneath said conveyor in vertical alignment with the ejector banks; and means responsive to the physical characteristics of the fruit on the supporting roller members passing beneath the ejector for moving the ejection member thereof from the inoperative position to the operative position to engage the fruit and cause it to be ejected from the supporting roller members and drop downwardly between spaced pairs of roller members onto a transversely extending conveyor.

5. Grading apparatus for fruit and the like, comprising: a continuous conveyor including transversely extending pairs of spaced supporting roller members mounted in spaced-apart relationship, the roller members in each pair of roller members being spaced to support fruit therebetween and the space between pairs of roller members being sufficient for fruit to pass therebetween, the supporting roller members containing aligned spaced rollers for supporting the fruit in predetermined spaced-apart positions thereon; means for moving the conveyor in one direction; means for rotating the roller members in a direction to move the tops thereof in the direction opposite to the movement of the conveyor; means for introducing fruit onto the supporting roller members between the rollers including oscillating board-like members extending transversely of the conveyor and having grooves in the upper surfaces thereof in alignment with the spaces between the rollers on the roller member; a bank of ejectors positioned over the conveyor and extending transversely thereof, each of said ejectors including an ejection member movable between an inoperative position away from the conveyor and an operative position adjacent the conveyor in which it projects into the path of fruit carried on said supporting roller members; and means responsive to the physical characteristics of the fruit on the supporting roller members passing beneath the ejector for moving the ejection member thereof from the inoperative position to the operative position.

6. Grading apparatus for fruit and the like, comprising: a continuous conveyor including transversely extending pairs of spaced supporting roller members mounted in spaced-apart relationship, the roller members in each pair of roller members being spaced to support fruit therebetween and the space between pairs of roller members being sufficient for fruit to pass therebetween; means for moving the conveyor in one direction; belt-like means in engagement with the supporting roller members for rotating the roller members in a direction to move the tops thereof in the direction opposite to the movement of the conveyor; means for introducing fruit onto the supporting roller members; a bank of ejectors positioned over the conveyor and extending transversely thereof, each of said ejectors including an ejection member movable between an inoperative position away from the conveyor and an operative position adjacent the conveyor in which it projects into the path of fruit carried on said supporting roller members; and means responsive to the physical characteristics of the fruit on the supporting roller members passing beneath the ejector for moving the ejection member thereof from the inoperative position to the operative position.

7. Grading apparatus for fruit and the like, comprising: a continuous conveyor including spaced-apart rotatably mounted fruit-supporting means extending transversely of the conveyor; means for moving the conveyor in one direction; means for rotating the fruit-supporting means in a direction to move the uppermost surfaces thereof in the direction opposite to the movement of the conveyor; means for introducing fruit onto the fruit-supporting means adjacent one end of the conveyor; a bank of ejectors positioned over the conveyor and extending transversely thereof, each of said ejectors including an ejection member movable between an inoperative position away from the conveyor and an operative position in which it projects into the path of the fruit carried on the fruit-supporting means; a light source for directing light onto the fruit as it approaches the bank of ejectors; and means responsive to the amount of light reflected from the fruit for moving each ejection member to the operative position.

8. Grading apparatus for fruit and the like, comprising: a continuous conveyor including spaced-apart rotatably mounted fruit-supporting means extending transversely of the conveyor; means for moving the conveyor in one direction; means for rotating the fruit-supporting means in a direction to move the uppermost surfaces thereof in the direction opposite to the movement of the conveyor; means for introducing fruit onto the fruit-supporting means adjacent one end of the conveyor; a plurality of banks of ejectors positioned over the conveyor and extending transversely thereof in spaced relationship, each of said ejectors including an ejection member movable between an inoperative position away from the conveyor and an operative position in which it extends into the path of movement of fruit carried on the fruit-supporting means; a light source associated with each bank of ejectors for directing light onto the fruit as it approaches said bank of ejectors; and means associated with each ejector responsive to the amount of light reflected from the fruit approaching it for moving its ejection member to the operative position.

9. The grading apparatus set forth in claim 8 in which the first bank of ejectors under which the fruit passes is adjusted to eject the fruit reflecting the greatest amount of light and the succeeding banks are adjusted to eject the fruit which progressively reflects a lesser amount of light.

10. Grading apparatus for fruit and the like comprising: a continuous conveyor having a loading end and a discharge end and including a plurality of spaced-apart rotatably mounted fruit-supporting means extending transversely of the conveyor, the supporting means supporting the fruit in predetermined spaced relationship transversely of the conveyor, the distance between adjacent supporting means being sufficient for fruit to freely pass downwardly therebetween; means for moving the conveyor from the loading end toward the discharge end; means for rotating the fruit-supporting means in a direction to move the upper surfaces thereof in the direction opposite to the movement of the conveyor; means for introducing fruit onto the fruit-supporting means at the loading end; a plurality of banks of ejectors positioned over the conveyor and extending transversely thereof in spaced relationship, each of said ejectors being spaced above a fruit-supporting position of the supporting means and including an ejection member movable between an inoperative position away from the conveyor and an operative position in which it projects into the path of the fruit carried on the supporting means; a plurality of transversely extending conveyor means positioned beneath said conveyor in vertical alignment with the ejector banks for receiving the fruit which is ejected thereby and which drops between the supporting means; a light source associated with each bank of conveyors for directing light onto the fruit as it approaches said bank of ejectors; and means associated with each ejector responsive to the amount of light reflected from the fruit approaching it for moving its ejection member to the operative position, the first bank of ejectors under which the fruit passes being adjusted to eject the fruit reflecting the greatest amount of light and the succeeding banks being adjusted to eject the fruit as the same progressively reflects a lesser amount of light.

11. The grading apparatus set forth in claim 10 in which the fruit with the least amount of light reflectively is discharged from the discharge end of the conveyor.

References Cited in the file of this patent

UNITED STATES PATENTS

| | | |
|---|---|---|
| 1,939,966 | Fotheringham | Dec. 19, 1933 |
| 2,656,923 | Cox | Oct. 27, 1953 |